United States Patent [19]
Nedwek et al.

[11] Patent Number: 5,701,420
[45] Date of Patent: Dec. 23, 1997

[54] METHOD FOR INITIALIZING AN ARRAY OF CONFIGURABLE COMPONENTS

[75] Inventors: David J. Nedwek; Howard Wilson, both of Beaverton; Steve Nugent; Greg Dermer, both of Portland, all of Oreg.

[73] Assignee: Intel Corporation, Santa Clara, Calif.

[21] Appl. No.: 744,123

[22] Filed: Nov. 5, 1996

Related U.S. Application Data

[63] Continuation of Ser. No. 227,598, Jul. 20, 1994, abandoned.
[51] Int. Cl.$^6$ .................................................. G06F 15/16
[52] U.S. Cl. ........................................ 395/284; 395/200.04
[58] Field of Search ............................ 395/284–5, 200.04; 307/465; 340/172.5

[56] References Cited

U.S. PATENT DOCUMENTS

| | | | |
|---|---|---|---|
| 3,680,052 | 7/1972 | Arulpragasam et al. | 340/172.5 |
| 4,150,438 | 4/1979 | Dorey et al. | 395/325 |
| 4,954,983 | 9/1990 | Klineman | 395/275 |
| 4,991,085 | 2/1991 | Pleva et al. | 395/275 |
| 5,287,531 | 2/1994 | Rogers, Jr. et al. | 395/800 |
| 5,305,457 | 4/1994 | Takida et al. | 395/700 |
| 5,325,529 | 6/1994 | Brown et al. | 395/700 |
| 5,336,950 | 8/1994 | Popli et al. | 307/465 |
| 5,339,432 | 8/1994 | Crick | 395/700 |
| 5,379,431 | 1/1995 | Lemon et al. | 395/700 |
| 5,386,567 | 1/1995 | Lien et al. | 395/700 |
| 5,410,706 | 4/1995 | Farrand et al. | 395/700 |
| 5,446,869 | 8/1995 | Padgett et al. | 395/500 |
| 5,467,295 | 11/1995 | Young et al. | 395/200.05 |

OTHER PUBLICATIONS

Designing with Microprocessors, Lawrence E. Getgen, 1985, pp. 51–64.
Microsoft Press Computer Dictionary, 1993, pp. 10 & 334.

Primary Examiner—Jack B. Harvey
Assistant Examiner—Paul R. Myers
Attorney, Agent, or Firm—Blakely, Sokoloff, Taylor & Zafman

[57] ABSTRACT

A method for configuring a plurality of configurable components within a computer system. The method includes the step of asserting a RESET signal for all of the configurable components. The RESET signal is asserted by a diagnostic processor within the system. The components each respond with an ERROR # signal which provides an indication to the diagnostic processor that the component is in an inactive state. After a predetermined number of clock signals the diagnostic processor configures a first component, then a second component and so forth and so on, until all of the components are configured. After all of the components are configured, the diagnostic processor deasserts the RESET signal for the first component, then deasserts the RESET signal for the second component and so forth and so on, until all of the RESET signals have been deasserted. Each component deasserts the ERROR # signal upon the deassertion of the RESET signal. The diagnostic processor allows normal operation to occur upon the deassertion of all the ERROR # signals.

4 Claims, 3 Drawing Sheets

METHOD FOR INITIALIZING AN ARRAY OF CONFIGURABLE COMPONENTS

This is a continuation application of application Ser. No. 08/277,598, filed Jul. 20, 1994, now abandoned.

BACKGROUND OF THE INVENTION

1. Field of the Invention

The present invention relates to a method for configuring a configurable component within a computer system.

2. Description of Related Art

When a computer system is initially powered up or reset, a diagnostic processor of the system will initialize and configure the various system components. Component initialization and configuration is typically performed in conjunction with a RESET signal generated by the diagnostic processor. For example, in a synchronous system a global RESET signal is initially asserted and distributed to all the components within a same global clock period. After a predetermined number of clock signals the RESET signal is deasserted and then the components are configured. For relatively small systems such as a personal computer such a methodology for component configuration is acceptable.

Large systems may contain a number of different "boxes" that are physically separated by a relatively large distance and which are coupled together by cables, connectors, etc. In a large system, the global RESET signal may reach some components later than other components. Additionally, the deassertion of the RESET signal also has a corresponding time delay. The time delays may result in some components running while other components are still in an inactive state. It would be desirable to provide a method for configuring components that was not dependent upon a synchronous RESET signal.

SUMMARY OF THE INVENTION

The present invention is a method for configuring a plurality of configurable components within a computer system. The method includes the step of asserting a RESET signal for all of the configurable components. The RESET signal is asserted by a diagnostic processor within the system. The components each respond with an ERROR # signal which provides an indication to the diagnostic processor that the component is in an inactive state. After a predetermined number of clock signals the diagnostic processor configures a first component, then a second component and so forth and so on, until all of the components are configured. After all of the components are configured, the diagnostic processor deasserts the RESET signal for the first component, then deasserts the RESET signal for the second component and so forth and so on, until all of the RESET signals have been deasserted. Each component deasserts the ERROR # signal upon the deassertion of the RESET signal. The diagnostic processor allows normal operation to occur upon the deassertion of all the ERROR # signals.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
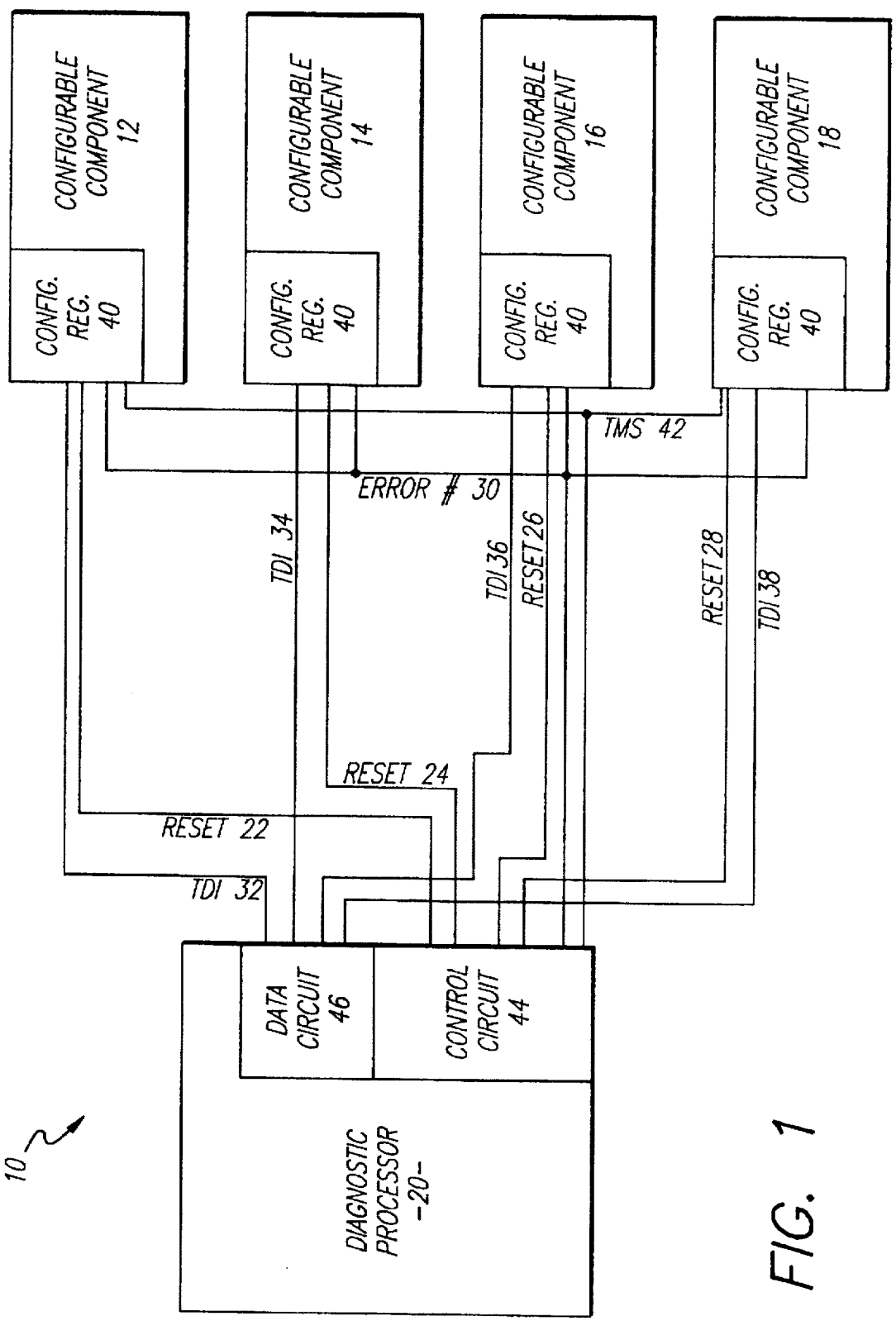
FIG. 1 is a system that contains a plurality of configurable components coupled to a diagnostic processor.
Figure 2A:
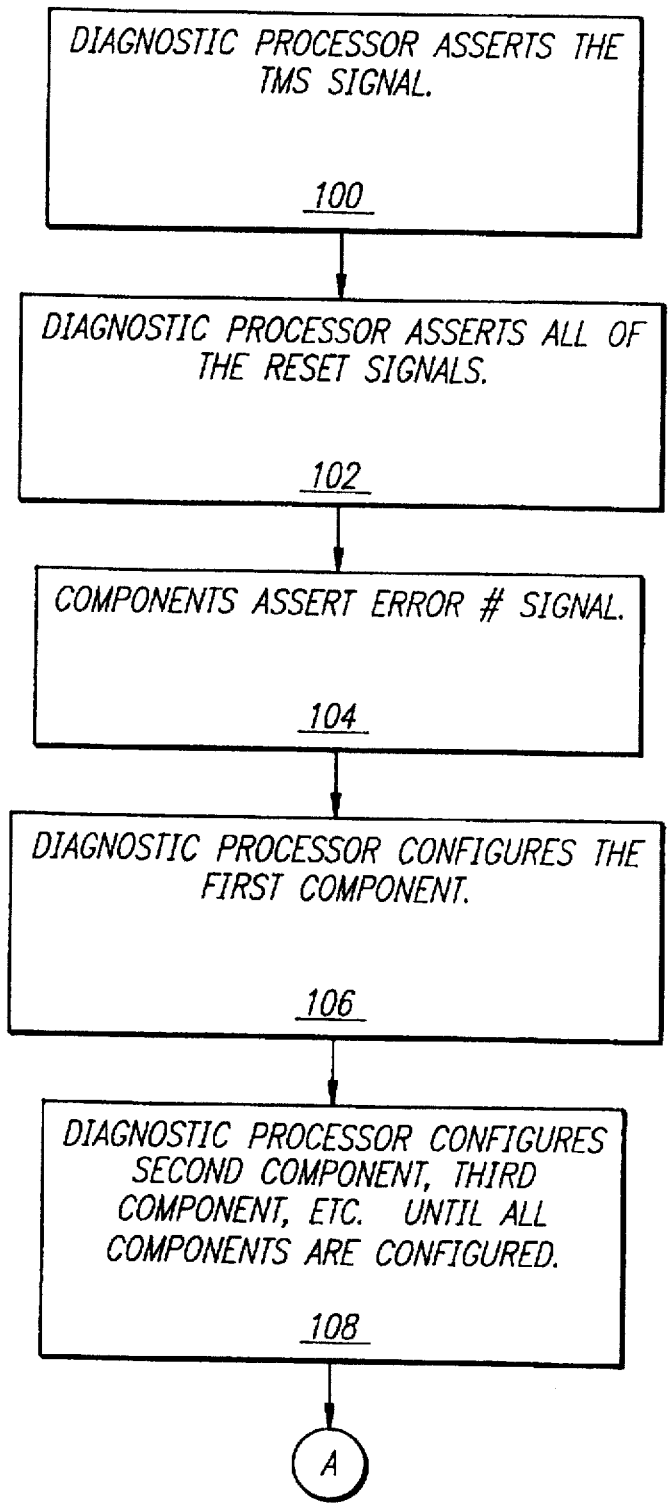
FIGS. 2a–b are flowcharts showing the components being configured by the diagnostic processor.
Figure 2B:
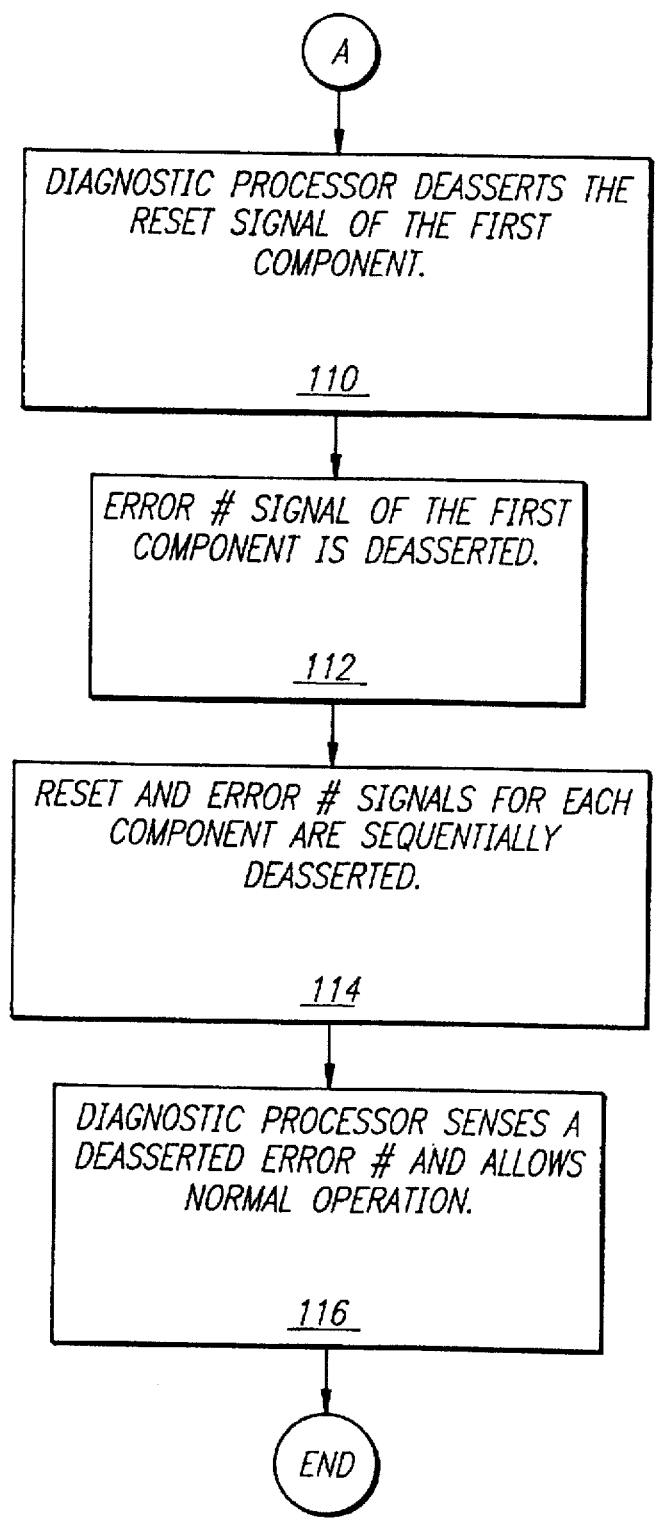

Referring to the drawings more particularly by reference numbers, FIG. 1 shows a system 10 that contains a plurality of configurable components 12–18 that are coupled to a diagnostic processor 20. By way of example, the configurable components may be I/O ports and memory devices of a computer system.

Each component is coupled to the diagnostic processor 20 by a separate RESET line 22–28. The components are also coupled to the diagnostic 20 by a common ERROR # line 30 and data lines TDI 32–38. Configuration data is serially loaded into the components from the diagnostic processor 22 on the data lines TDI 32–38. Each component 12–18 has a plurality of shift registers 40 that store the configuration data. The system also has a test mode signal line (TMS) 42 that allows the diagnostic processor 22 to place the system in a test mode.

The diagnostic processor 20 contains a control circuit 44 and a data circuit 46. The data circuit 46 provides the configuration data to the components. The control circuit 46 contains logic to assert and deassert the RESET and TMS signals and control the flow of data to the components.

Upon power up or reset of the system, the control circuit 44 asserts the TMS signal 42 to place the system within the test mode. The control circuit 44 contains a state machine that then asserts the RESET signals 22–28 for each component 12–18 after a predetermined time interval.

The components each assert an ERROR # signal in response to the assertion of the RESET signals 22–28. When all of the RESET signals have been asserted, the control circuit 44 causes the data circuit 46 to sequentially load the configuration data into each component. After configuring the components, the diagnostic 20 sequentially deasserts the RESET signals 22–28 of each component. The components deassert the ERROR # signal 30 in response to the deassertion of the RESET signals. When all of the ERROR # signals have been deasserted the diagnostic 20 deasserts the TMS signal 42 and allows the system to operate in a normal mode.

In operation, as shown in processing block 100 the diagnostic processor 20 initially asserts the TMS signal 42 for the component 12–18. The processor 20 then asserts the RESET signals 22–28 for all of the components in block 102. The assertion of the RESET signals 22–28 typically occurs a predetermined number of clock cycles after the assertion of the TMS signal 42 to allow the components to stabilize. In response to the assertion of the RESET signal, the components each assert an ERROR # signal in block 104.

In processing block 106, while the RESET signals are asserted, the diagnostic 20 initially configures the first component 12 by providing a configuration data string which is loaded into the configuration registers of the component. After the first component 12 is configured, the diagnostic 20 configures the second component 14, then the third component 16 and so forth and so on, until all of the components are configured, as shown in block 108.

In processing block 110 the diagnostic processor 20 deasserts the RESET signal 22 for the first component 12. After a certain time interval the first component 12 deasserts its ERROR # signal in block 112. Because all of the ERROR # signals of the components are tied to the same line, the diagnostic 20 still senses an asserted ERROR # signal, even though the first components ERROR # signal has been deasserted. In block 114 the diagnostic processor 20 proceeds to deassert the RESET signal for the second component 14, then the third component 16 and so forth and so on, until the RESET signal for the last component has been deasserted. Each component deasserts its ERROR # signal in response to the deassertion of the RESET signal.

In processing block 116, when the last component has deasserted its ERROR # signal the diagnostic 20 senses a deasserted ERROR # signal 30 and allows normal operation of the system. The present invention assures that all components are in an active state before beginning normal operation of the system.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for configuring a plurality of configurable components within a computer system, comprising the steps of:

a) asserting a test mode signal (TMS) to switch the computer system from a normal mode to a test mode;

b) asserting a first RESET signal for a first configurable component and a second RESET signal for a second configurable component;

c) asserting a first ERROR # signal by said first configurable component, wherein said first ERROR # signal is indicative of an inactive state of said first configurable component;

d) asserting a second ERROR # signal by said second configurable component, wherein said second ERROR # signal is indicative of an inactive state of said second configurable component;

e) loading a configuration data string into said first configurable component;

f) loading a configuration data string into said second configurable component;

g) deasserting said first RESET signal;

h) deasserting said first ERROR # signal;

i) deasserting said second RESET signal;

j) deasserting said second ERROR # signal; and, k) deasserting said TMS signal to switch the computer system from the test mode to the normal mode.

2. A system that configures a plurality of configurable components in a computer system, comprising:

a plurality of configurable components that each have a plurality of configuration registers that can store configuration data in conjunction with an assertion of a RESET signal, each said configurable component asserts an ERROR # signal upon the assertion of said RESET signal and deasserts said ERROR # signal upon a deassertion of said RESET signal, said ERROR # signal being indicative of an inactive state of said configurable component; and, a diagnostic processor that asserts a corresponding RESET signal and provides configuration dam to said configurable components while said RESET signal is asserted and deasserts said RESET signal after said configurable component stores the configurable data, said diagnostic processor asserts a test mode signal (TMS) to switch the computer system from a normal mode to a test mode before assertion of said RESET signal, and deasserts said TMS signal to switch the computer system from the test mode to the normal mode after all of said ERROR# signals of said configurable components have been deasserted.

3. The system as recited in claim 2, wherein said diagnostic processor sequentially loads configuration data strings into a plurality of configurable components while said RESET signal is asserted.

4. The system as recited in claim 3, wherein said diagnostic processor asserts RESET signals of said plurality of configurable components and sequentially deasserts said RESET signals after said configuration data strings are loaded into said configurable components.

* * * * *